Jan. 13, 1953  B. J. BAECHER  2,625,457
COURSE RECORDER
Filed July 26, 1951
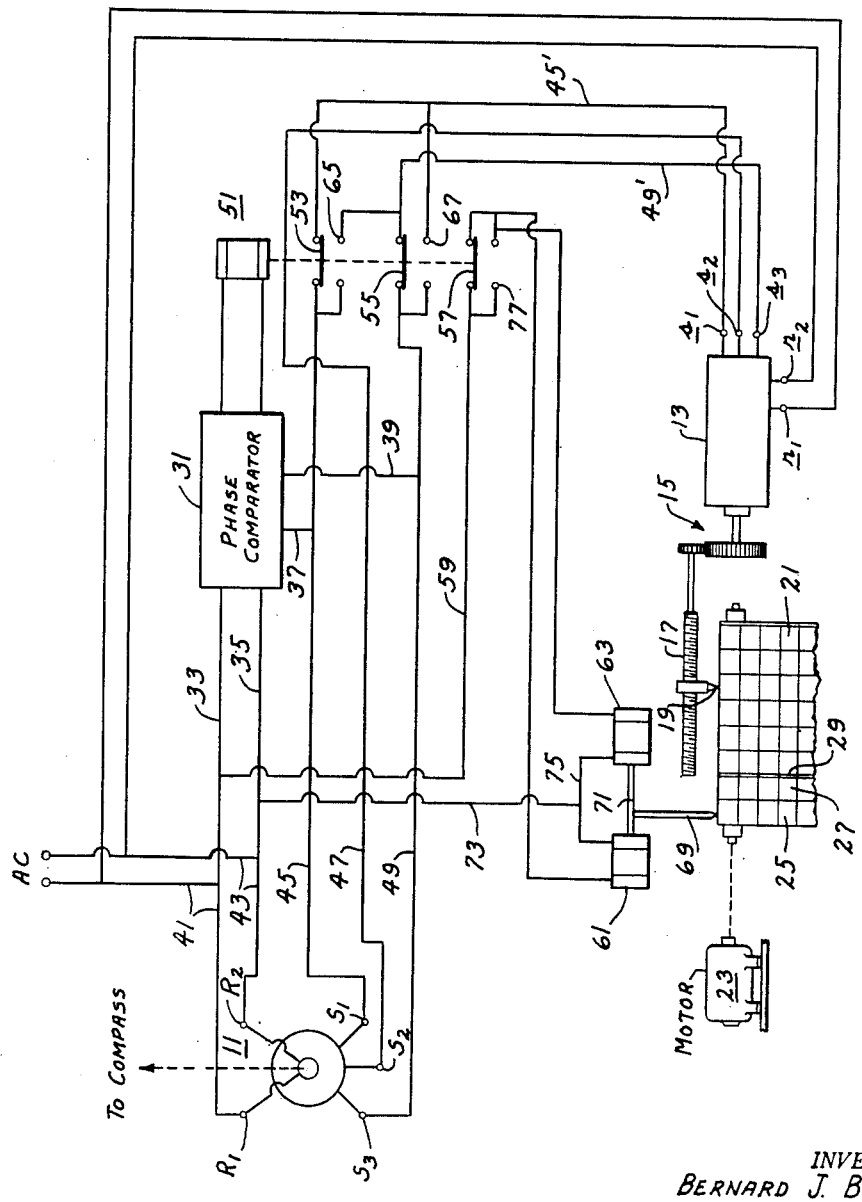
INVENTOR.
BERNARD J. BAECHER
BY
*D. C. Ayler*
*Roderick B. Jones*
ATTORNEYS Patented Jan. 13, 1953

2,625,457

UNITED STATES PATENT OFFICE 2,625,457

COURSE RECORDER

Bernard J. Baecher, Sea Cliff, N. Y.

Application July 26, 1951, Serial No. 238,759

10 Claims. (Cl. 346—8)

(Granted under Title 35, U. S. Code (1952), sec. 266)

The present invention relates to course recorders for dirigible craft, and more particularly to the type in which the width of strip chart represents less than a full turn of the craft. A course recorder of the type is described in the U. S. Patent to E. A. Sperry, No. 1,850,978, granted March 22, 1932 for Recorder for Ships.

The invention described herein may be manufactured and used by or for the Government of the United States of America without the payment of any royalties thereon or therefor.

Recorders heretofore described have used multiple printers carried on radial arms from a shaft geared to a synchro motor to provide an indicator having a chart of which the width represents a fraction of a full turn of the craft. Alternatively, there have been employed drum-type cams and cam followers, with the cams being attached to a synchro motor while the follower drives a recording pen. Recorders of each type, for accurate presentation of data, require excessively complicated structural arrangements and high precision of construction.

It is the purpose and principal object of the present invention generally to improve course recorders of the above-described type, and particularly, to provide an accurate course recorder that is simpler in construction without sacrificing precision of presentation.

In accordance with the present invention, I provide a synchro course recorder in which a worm drive carries a pen marker, said recorder including means for reversing the worm drive at the 0 and 180 degree positions of the shaft of which the angular motion is to be recorded. Means are also provided automatically to indicate whether the 0°–180° zone or the 180°–360° is instantly being recorded.

For reversing the worm drive and for actuating the zone-indicating means, phase-sensitive switching means are provided, which compares the phase of the voltage at a selected pair of terminals of the multiphase winding of a transmitter synchro with the voltage at the terminals of the single-phase winding thereof, and reverses the connection of the said pair of terminals at the desired extremal positions of the shaft.

Other objects and many of the attendant advantages of this invention will be readily appreciated as the same becomes better understood by reference to the following detailed description when considered in connection with the accompanying drawing, wherein the single figure is a diagrammatic representation, partly schematic, of the recorder of the present invention.

The recorder of my present invention is shown, comprising a transmitter 11 and a repeater motor 13, each of which can be of the type commonly known as a synchro, autosyn, selsyn or other similar self-synchronous machine, having rotor and stator members, either of which members includes a multiphase winding, the other having a single-phase winding. As here shown, the rotor of the transmitter 11 is driven, through suitable gearing (not shown), by a compass, and the motor 13 is geared, as at 15, to a worm 17, which is shown carrying a marking pen or point 19.

The pen 19 is driven so as to make one complete round trip across a strip chart 21 for each full turn of the craft. As shown, the chart 21 is itself driven, by a suitable motor 23, and in a direction at right angles to the movement of the pen 19. The chart 21 can be of the type commonly used for recordation of the course, speed and other characteristics of the movement of craft. The above-cited patent to Sperry illustrates a suitable chart, although for the present description, instead of the quadrantal columns commonly provided at the left side of the strip, there are shown here two columns 25, 27 to the left of a double line 29, in which columns indications are made to represent the course of the craft in the zones 0°–180° and 180°–360°, respectively.

For accomplishing the reversal of the movement of the worm 17 and the pen 19 at the 0° and 180° positions, I provide phase comparator apparatus 31, which is connected to compare the voltage developed at the terminals $R_1$ and $R_2$ of the single-phase winding of the transmitter 11 with the voltage appearing across the terminals $S_1$ and $S_3$ of the multiphase winding thereof. The legends $R_1$, $R_2$, $S_1$, $S_2$ and $S_3$ are here employed, as is common, to designate the terminals of conventional self-synchronous machines of the synchro or similar type.

The phase comparator 31 can be of any suitable conventional apparatus for comparing the phases of the selected voltages. Suitable arrangements for this purpose are described in "Electronic Instruments" by Ivan A. Greenwood, Jr., J. Vance Holdam, Jr., and Duncan Macrae, Jr., published by McGraw-Hill Book Company, Inc., N. Y., 1948, pages 383–386, reference to which is hereby made for fuller description. As shown, the comparator is connected by lines 33, 35 to receive a portion of the voltage at the terminals $R_1$, $R_2$ of transmitter 11 and simultaneously, as by lines 37, 39 to receive a portion of the voltage at the terminals $S_1$, $S_3$. If desired, suitable amplification means can be incorporated in the comparator to amplify the output signal.

Transmission lines 41 and 43 connect terminals $R_1$ and $R_2$ to the corresponding terminals $r_1$ and $r_2$ respectively of the repeater 13, and lines 45, 47 and 49 connect terminals $S_1$, $S_2$ and $S_3$ of the transmitter 11 to the corresponding terminals $s_1$, $s_2$, and $s_3$ of the repeater 13.

A relay 51, of which the coil is connected to receive the output of the phase comparator 31 actuates an assembly of ganged contact members 53, 55 and 57. In the position illustrated, contact member 53 closes a circuit between terminals $S_1$ and $s_1$ by way of lines 45 and 45'. Similarly, contact member 55 closes a circuit between terminals $S_3$ and $s_3$ by way of lines 49 and 49'. The circuit between terminals $S_2$ and $s_2$, it will be observed, is constantly maintained by line 47, independently of actuation of relay 51. Contact member 57 is disposed in a connection 59 extending between transmission line 33 and a pair of electromagnetic relays 61, 63 for a purpose to be described hereinbelow.

Reversed-circuit connections are effected by downward movement of contact members 53 and 55 to contact points 65 and 67, respectively, whereby terminals $S_1$ and $s_3$ are connected and terminals $S_3$ and $s_1$ are connected. Such reversal of the connections is accompanied by a reversal in direction of rotation of the repeater rotor, and the angle transmitted when $S_1$ is connected to $s_3$ and $S_3$ is connected to $s_1$ is equal to 360° minus the angle transmitted when $S_1$ is connected to $s_1$ and $S_3$ is connected to $s_3$.

The foregoing characteristic of synchro operation together with the fact that in normal synchro operation, the $S_1$ to $S_3$ voltage is 180° out of phase with the $R_1$ to $R_2$ voltage when the transmitted angle lies between 0° and 180°, and in phase with the same $R_1$ to $R_2$ voltage when the transmitted angle lies between 180° and 360° form the basis of operation of the apparatus of my invention. Thus, it will be apparent that when the craft deviates from true North, the pen moves say from left to right until the deviation reaches 180°, whereupon the phase comparator 31 detects and responds to a 180° phase difference between the voltages applied thereto, and supplies a voltage signal to the relay 51 actuating it to cause a reversal of the $S_1$ and $S_3$ terminals relative the corresponding $s_1$, $s_3$ terminals. This reversal produces a reversal of the rotation of the worm 17 causing the pen to move from right to left.

Indication of the proper zone is provided by pen 69 that is carried on a common armature 71 of the electromagnets 61, 63. As noted above, the latter electromagnets are connected through line 59 to one of the terminals $R_1$ of the transmitter 11 and to the other terminal $R_2$ by the connection 73. The other end of connection 73 is at the junction of a connector 75 between the electromagnets 61, 63. Thus the electromagnets 61, 63 are adapted for alternate actuation in accordance with the position of contactor member 57, so that with the member 57 in the position shown, electromagnet 61 is actuated while electromagnet 63 is open-circuited causing the armature to be drawn to the left and the pen mark is made in the column 25, indicating the 0°–180° zone. On reversal of the direction of rotation of the worm contactor, member 57 closes the lower contact points 77 causing actuation of the electromagnet 63 and open-circuiting electromagnet 61. Thus armature 71 is drawn to the right and a mark is made in the column 27 for indicating the 180°–360° zone.

Although my invention has been described as embodied in a two-zone recorder arrangement, it will now be apparent that, if required, 6 or higher-valued strip charts can be employed merely by using additional voltages at the synchro transmitter and suitably designing the phase comparator circuits to select the desired sector. Also, direct-current synchros can be used in place of the alternating-current synchros described hereinabove.

Obviously many other modifications and changes can be made in the present invention without departing from the spirit and scope of the appended claims.

I claim:

1. In a synchro-course recorder for dirigible craft; the combination with the compass; of a repeater motor driven from the compass; a chart; a marking pen; means controlling said pen to be driven by said motor for a predetermined number of round-trip excursions across the chart for each full turn of the craft, said means comprising a worm connected to drive said pen, and phase-sensitive switching means connected to reverse the rotation of said worm at preselected points of the compass; and means responsive to said switching means for indicating on said chart which single-trip excursion of said excursions is instantly being recorded.

2. In the recorder as defined in claim 1, said predetermined number of round trips corresponding to units and said preselected compass points being 0° and 180°.

3. In a synchro-course recorder for dirigible craft; the combination with the compass; of a repeater motor driven from the compass; a movable chart; a marking pen; and means controlling said pen to be driven by said motor for one round-trip excursion across the chart for each full turn of the craft, said controlling means comprising a worm connected to drive said pen, switch means in circuit with said repeater, phase-sensitive means connected to actuate said switch means to reverse the rotation of said motor at the 0 and 180 degree points of the compass; and means responsive to actuation of said switch means indicating said actuation.

4. The recorder as defined in claim 3 further comprising a transmitter connected to transmit direction data from said compass, and means connecting said transmitter and repeater motor, said switch means being interposed in said connecting means.

5. The recorder as defined in claim 3, last said means being actuatable in synchronism with said switch means to indicate the sense of rotation of said motor.

6. The synchro-course recorder for dirigible craft, comprising a transmitter connected to transmit direction data of a compass, a repeater motor connected to said transmitter, a chart, a marking pen, said pen being adapted to be driven by said motor for one round-trip excursion across the chart for each full turn of the craft, phase-sensitive switching means connected to reverse the rotation of said motor at the 0 and 180 degree points of the compass, and means indicating on said chart when said connections to the motor are reversed.

7. In a self-synchronous data transmission system including a transmitter and a receiver each having relatively rotatable single- and plural-winding members respectively interconnected so that the movable receiver member normally continuously follows the relative angular displacement of the transmitter member, phase-sensitive means adapted to generate a control voltage corresponding to a predetermined phase difference between the voltage across the single-winding members and the voltage across a selected pair of windings of the plural winding members, means responsive to said control voltage for interchanging the connections of said selected pair of windings, thereby to cause reversal of the sense of angular displacement of the movable receiver member and means indicating said reversal.

8. The system as in claim 7 wherein said predetermined phase difference corresponds to 180°.

9. The system as in claim 7 wherein said last-named means comprises switch means interposed in the connections between said transmitter and said receiver.

10. In a self-synchronous data transmission system including a transmitter and a receiver each having relatively rotatable single- and plural-winding members respectively interconnected so that the movable receiver member normally continuously follows the relative angular displacement of the transmitter member, phase-sensitive means adapted to generate a control voltage corresponding to a 180° phase difference between the voltage across the single-winding members and the voltage across a selected pair of windings of the plural winding members, means responsive to said control voltage for interchanging the connections of said selected pair of windings, thereby to cause reversal of the sense of angular displacement of the movable receiver member, means continuously indicating said reversal while said phase difference exists and recording means comprising a stylus connected to be driven by said receiver and including a screw, means threadedly engaging said stylus on said screw, whereby the direction of travel of said stylus is altered on the occurrence of said 180° phase difference.

BERNARD J. BAECHER.

No references cited.